United States Patent
Sakakibara et al.

(10) Patent No.: US 10,003,713 B2
(45) Date of Patent: Jun. 19, 2018

(54) IMAGE FORMING METHOD AND IMAGE FORMING APPARATUS COMPRISING A SCANNER SECTION AND A LIGHT REFLECTION AREA DETERMINATION SECTION

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Jun Sakakibara, Tokyo (JP); Katsuya Nagamochi, Tokyo (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/092,081

(22) Filed: Apr. 6, 2016

(65) Prior Publication Data
US 2017/0295291 A1 Oct. 12, 2017

(51) Int. Cl.
*H04N 1/193* (2006.01)
*H04N 1/04* (2006.01)

(52) U.S. Cl.
CPC ..................... *H04N 1/04* (2013.01)

(58) Field of Classification Search
USPC ....... 358/1.1–3.23, 1.11–1.18, 504, 505, 481
See application file for complete search history.

(56) References Cited

U.S. PATENT DOCUMENTS

| | | | | |
|---|---|---|---|---|
| 5,101,285 | A * | 3/1992 | Kawai | H04N 1/02865 250/208.1 |
| 5,659,838 | A * | 8/1997 | Ando | G03G 15/507 355/75 |
| 5,729,024 | A * | 3/1998 | Baba | G03G 15/607 250/236 |
| 2003/0085894 | A1* | 5/2003 | Tatsumi | G06T 15/506 345/426 |
| 2005/0128524 | A1* | 6/2005 | Liu | B41M 5/00 358/3.06 |
| 2007/0177233 | A1* | 8/2007 | Ichikawa | H04N 1/00795 358/509 |
| 2008/0017717 | A1* | 1/2008 | Miyazaki | G06K 7/10574 235/472.01 |
| 2010/0214630 | A1* | 8/2010 | Takaura | H04N 1/02815 358/474 |
| 2012/0320386 | A1* | 12/2012 | Sone | G03G 15/0189 358/1.1 |

(Continued)

FOREIGN PATENT DOCUMENTS

JP 2000-123152 4/2000
JP 2013-005334 1/2013

*Primary Examiner* — Marcellus Augustin
(74) *Attorney, Agent, or Firm* — Amin, Turocy & Watson LLP (57) ABSTRACT

An image processing apparatus comprises a scanner section and an area determination section. The scanner section reads the light reflected from an original document after the light penetrates a light diffusion sheet to output first image data, wherein the light diffusion sheet has a surface for diffusing the light reflected from the original document including a mirror reflection area; and the area determination section determines the mirror reflection area with respect to the first image data output from the scanner section.

5 Claims, 7 Drawing Sheets

(56) References Cited

U.S. PATENT DOCUMENTS

| | | | | |
|---|---|---|---|---|
| 2014/0293341 A1* | 10/2014 | Yasutomi | ............ | H04N 1/6097 358/1.15 |
| 2016/0048221 A1* | 2/2016 | Boulanger | ............ | G06F 3/0321 345/594 |
| 2016/0080625 A1* | 3/2016 | Itoh | .................... | G06K 9/00771 348/234 |

* cited by examiner

IMAGE FORMING METHOD AND IMAGE FORMING APPARATUS COMPRISING A SCANNER SECTION AND A LIGHT REFLECTION AREA DETERMINATION SECTION

FIELD

Embodiments described herein relate generally to an image processing apparatus.

BACKGROUND

Conventionally, when a copier reads an original document on which golden or silver characters or images having a mirror reflection property are printed, there is a problem that the characters or images having a mirror reflection property are black in the read image. A copier has a structure for reading the light reflected from an original document with an image sensor. Thus, the characters having a mirror reflection property reflects the light emitted from a light source; however, as there is no reflected light towards the image sensor, the characters having a mirror reflection property are black.

As an existing technology for addressing such a problem, the technology is known which has been disclosed in Japanese Unexamined Patent Application Publication No. 2013-5334 and which relates to an image reading apparatus.

However, the foregoing conventional technology refers to a structure in which a plurality of light sources and light-transmitting members are assembled and therefore has disadvantages including complicated structure and expensive cost.

DETAILED DESCRIPTION

In accordance with an embodiment, an image processing apparatus comprises a scanner section and an area determination section. The scanner section reads the light reflected from an original document after the light penetrates a light diffusion sheet to output first image data, wherein the light diffusion sheet has a side for diffusing the light reflected from the original document including a mirror reflection area. The area determination section determines the mirror reflection area with respect to the first image data output from the scanner section.

The image processing apparatus of an embodiment is described below with reference to accompanying drawings.

Figure 1:
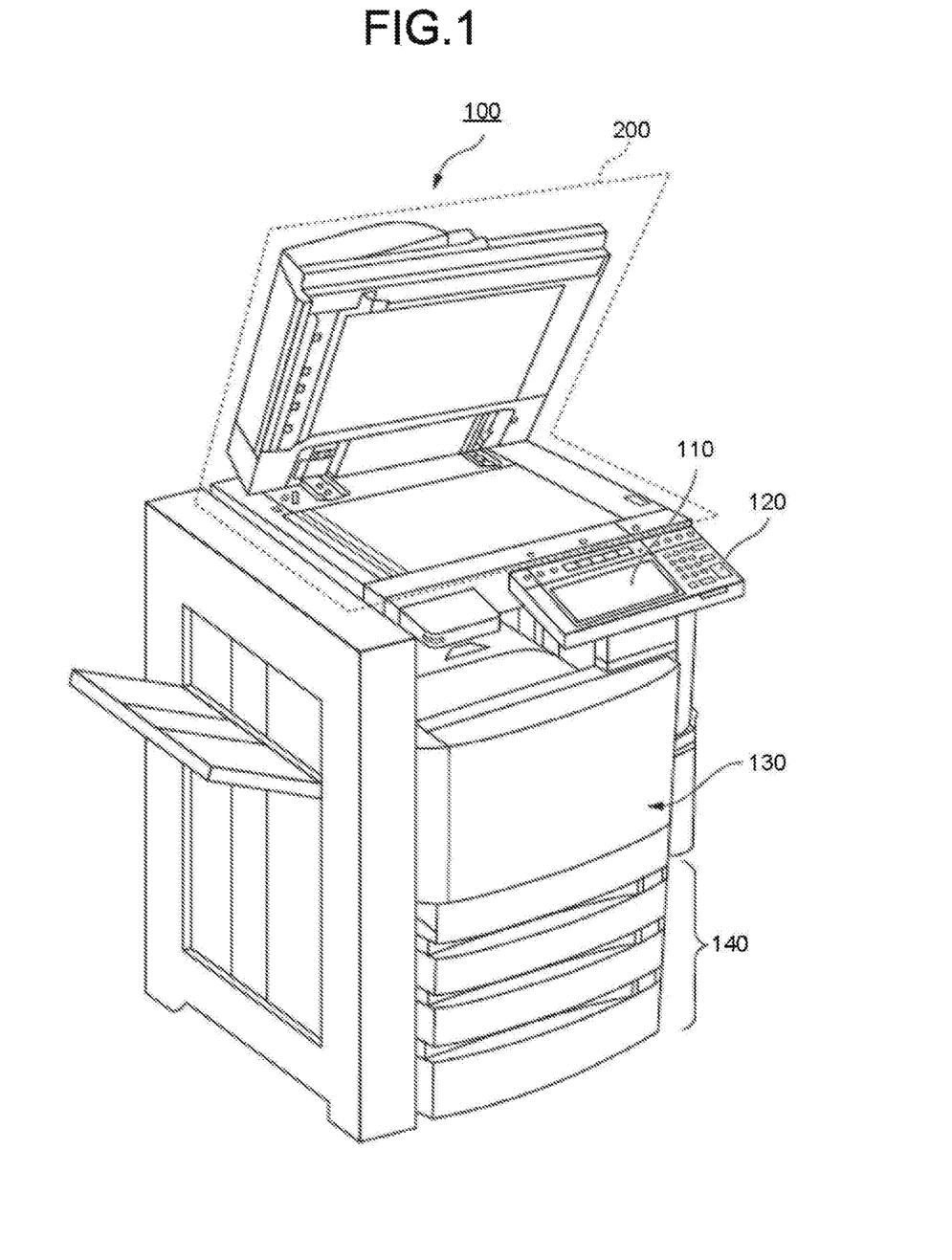
FIG. 1 is an external view exemplifying the whole structure of an image processing apparatus 100 according to an embodiment.

FIG. 1 is an external view exemplifying the whole structure of the image processing apparatus 100 according to the embodiment. The image processing apparatus 100 is an image forming apparatus such as a digital multi-functional peripheral. The image processing apparatus 100 comprises an operation display section 110, a control panel 120, a printer section 130, a sheet accommodation section 140 and an image reading section 200. The printer section 130 of the image processing apparatus 100 may be an apparatus for fixing a toner image or an inkjet-system apparatus.

The image processing apparatus 100 reads an image presented on a sheet to generate digital data to generate an image file. The sheet is, for example, a sheet on which an original document, characters and images are recorded. The sheet may be any object that can be read by the image processing apparatus 100.

The operation display section 110 is an image display device such as a liquid crystal display or an organic EL (Electro Luminescence) display. The operation display section 110 displays various kinds of information relating to the image processing apparatus 100. The operation display section 110 also functions as a touch panel for receiving an operation of the user. The user can set the operation and the function of the image processing apparatus 100 by carrying out an input operation on the operation display section 110.

The control panel 120 equipped with a plurality of buttons receives an operation of the user and outputs a signal corresponding to the operation executed by the user to the control section of the image processing apparatus 100. The control panel 120 includes a button for instructing a scanner to start reading an original document.

The printer section 130 forms an image on a sheet according to image information generated by the image reading section 200 or image information received through a communication path. The printer section 130 forms the image through the following processing. The image forming section of the printer section 130 forms an electrostatic latent image on a photoconductive drum according to the image information. The image forming section of the printer section 130 forms a visible image by attaching a developing agent to the electrostatic latent image, and toner is known as a concrete example of the developing agent. The transfer section of the printer section 130 transfers the visible image onto a sheet. The fixing section of the printer section 130 fixes the visible toner on the sheet by heating and pressurizing the sheet. The sheet on which the image is formed may be a sheet fed from the sheet accommodation sheet 140 or a manually fed sheet.

The sheet accommodation section 140 accommodates a sheet which is used in the printer section 130 for image formation.

The image reading section 200 reads the image information of a read object as light intensity. The image reading section 200 records the read image information. The recorded image information may also be sent to another information processing apparatus through a network. The recorded image information may be used by the printer section 130 to form an image on a sheet.

Figure 2:
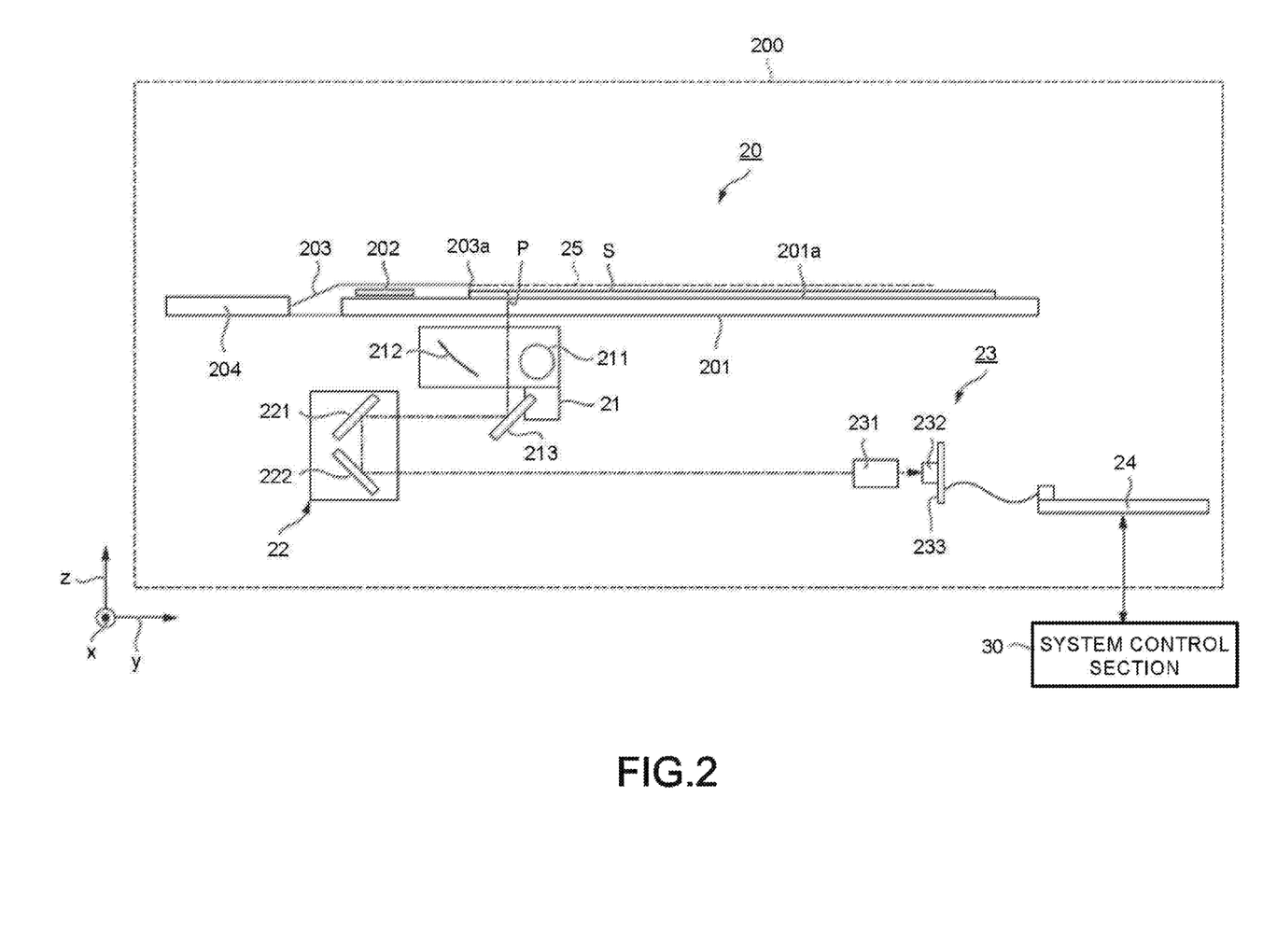
FIG. 2 is a schematic diagram exemplifying the structure of an image reading section 200.

FIG. 2 is a schematic diagram exemplifying the structure of the image reading section 200.

The image reading section 200 comprises an original document table 20, a first carriage 21, a second carriage 22, an image capturing section 23 and a control section 24. The first carriage 21 moves in a sub-scanning direction y. In the original document table 20, the direction orthogonal to the sub-scanning direction y is a main scanning direction x. The direction orthogonal to the main scanning direction x and the sub-scanning direction y is a height direction z.

The original document table 20 comprises an original document table glass 201, a shading plate 202, an original document scale 203 and a through-read glass 204.

The original document table glass 201 has a setting surface 201a for placing a detection sheet S or a sheet 25 which is an original document. The detection sheet S is placed by the user between the original document table glass 201 and the sheet 25 when the sheet 25 is read on which golden or silver characters and images having a mirror reflection property (hereinafter referred to as a mirror reflection area) are printed. To diffuse the light reflected from the sheet 25, diffuse reflection sides having tiny recesses and protrusions are arranged on the surface of one or both sides of the detection sheet S.

The shading plate 202 consisting of a white member has a white color which serves as a reference for the shading correction of the image (hereinafter referred to as 'a read image') read from the sheet 25. The shading plate 202 takes the shape of a rectangle in the main scanning direction x. The original document scale 203 indicates the positions of the sheet 25 and the detection sheet S that are placed on the original document table glass 201. A front end reference section 203a is arranged on one end of the original document scale 203. A difference is formed between the front end reference section 203a and the setting surface 201a of the original document table glass 201, thereby forming a protrusion for pressing an end of the sheet 25 and an end of the detection sheet S. The positions of the sheet 25 and the detection sheet S are determined through the press by the front end reference section 203a on the original document table glass 201. The position where the corners of the front ends of the sheet 25 and the detection sheet S are placed is determined on the setting surface 201a in advance. The main scanning direction x and the sub-scanning direction y are positioned by placing the corners of the front ends of the sheet 25 and the detection sheet S at the pre-determined position.

The first carriage 21 comprises a light source 211, a reflector 212 and a first mirror 213. The light source 211 gives out light. The reflector 212 reflects the light emitted from the light source 211. The light reflected by the reflector 212 irradiates the shading plate 202 and the sheet 25 uniformly. The light distribution characteristic of the reading position of the sheet 25 in the main scanning direction x is adjusted according to reflected light of the illuminating light. The first mirror 213 reflects the light reflected by the shading plate 202 and the sheet 25 towards a second mirror 221 of the second carriage 22.

The second carriage 22 comprises the second mirror 221 and a third mirror 222. The second mirror 221 reflects the light reflected by the first mirror 213 towards the third mirror 222. The third mirror 222 reflects the light reflected by the second mirror 221 towards a condensing lens 231 of the image capturing section 23.

The image capturing section 23 comprises the condensing lens 231, a CCD sensor 232 and a CCD substrate 233. The condensing lens 231 converges the light reflected by the third mirror 222. The condensing lens 231 images the converged light on the imaging surface (reading surface) of the CCD sensor 232. The CCD sensor 232 is mounted on the CCD substrate 233. For example, the CCD sensor 232 is a hybrid 4-line sensor consisting of a 3-line sensor for reading a color image and a 1-line sensor for reading a monochrome image. The 3-line sensor reads Red (R) light, Green (G) light and Blue (B) light. The CCD sensor 232 converts the light imaged by the condensing lens 231 into charges. Through the conversion, the CCD sensor 232 converts the image imaged by the condensing lens 231 into an electric signal. The CCD substrate 233 generates image data according to the electric signal generated through the photoelectric conversion by the CCD sensor 232. The CCD substrate 233 generates image data with correction information obtained through a shading correction processing in advance when the image data is generated. The CCD substrate 233 outputs the generated image data to the control section 24. The processing of the CCD substrate 233 is specifically carried out by an AFE (Analog Front End) mounted on the CCD substrate 233.

The control section 24 controls the first carriage 21, the second carriage 22 and the image capturing section 23. For example, the control section 24 controls the movement of the first carriage 21 and the 'on/off' of the light source 211 of the first carriage 21. For example, the control section 24 controls the operations of the image capturing section 23.

The control section 24 controls the image processing apparatus 100 to be in either of a normal state and a low power state. The normal state refers to a state in which the image of an original document can be read according to an instruction from the user. In the normal state, a timing generator mounted on the CCD substrate 233 outputs a CCD control signal to the CCD sensor 232. In the low power state, the image of an original document cannot be read according to an instruction from the user, but less power is consumed than that in the normal state. In the low power state, the timing generator mounted on the CCD substrate 233 is stopped. Thus, no CCD control signal is output in the low power state. Consequentially, the CCD sensor 232 is stopped in the low power state.

The first carriage 21 is moved towards the sub-scanning direction y under the control of the control section 24. The second carriage 22 is moved towards the same direction with the first carriage 21 at half the speed of the first carriage 21 as the first carriage 21 is moving so that the length of the optical path of the light reaching the imaging surface of the CCD sensor 232 is not changed even if the first carriage 21 is moved. In other words, the length of the optical path of the light in an optical system consisting of the first mirror 213, the second mirror 221, the third mirror 222 and the condensing lens 231 is fixed. In other words, the length of the optical path from the setting surface 201a to the imaging surface of the CCD sensor 232 is fixed.

For example, in the example shown in FIG. 2, the first carriage 21 is moved from left to right along the sub-scanning direction y. A reading position P for the sheet 25 is also changed with the movement of the first carriage 21 towards the sub-scanning direction y. Thus, the reading position P is moved from left to right along the sub-scanning direction y. The reading position P is a position corresponding to a line in the main scanning direction x. As the reading position P is moved towards the sub-scanning direction y, the images of the reading position P for the sheet 25 are imaged on the imaging surface of the CCD sensor 232 in order. The CCD sensor 232 outputs a signal corresponding to the image of the imaged reading position P as a signal corresponding to one line in the main scanning direction x. The CCD substrate 233 generates the image data of the whole sheet 25 according to signals corresponding to a plurality of lines.

The image processing apparatus 100 comprises a system control section 30 for processing the image data read by the image reading section 200. The system control section 30 receives image data from the control section 24 in the image reading section 200. The system control section 30 carries out an image processing on the received image data corresponding to setting by a user.

The image processing apparatus 100 of the embodiment has a working mode in which the detection sheet S is used, for example, a special document mode in which the sheet 25 having a mirror reflection area can be read more properly. The feature of the image processing apparatus 100 is described below based on an example of the structure of the detection sheet S and an example of the operations carried out by the image processing apparatus 100 in a special document mode.

Figure 3:
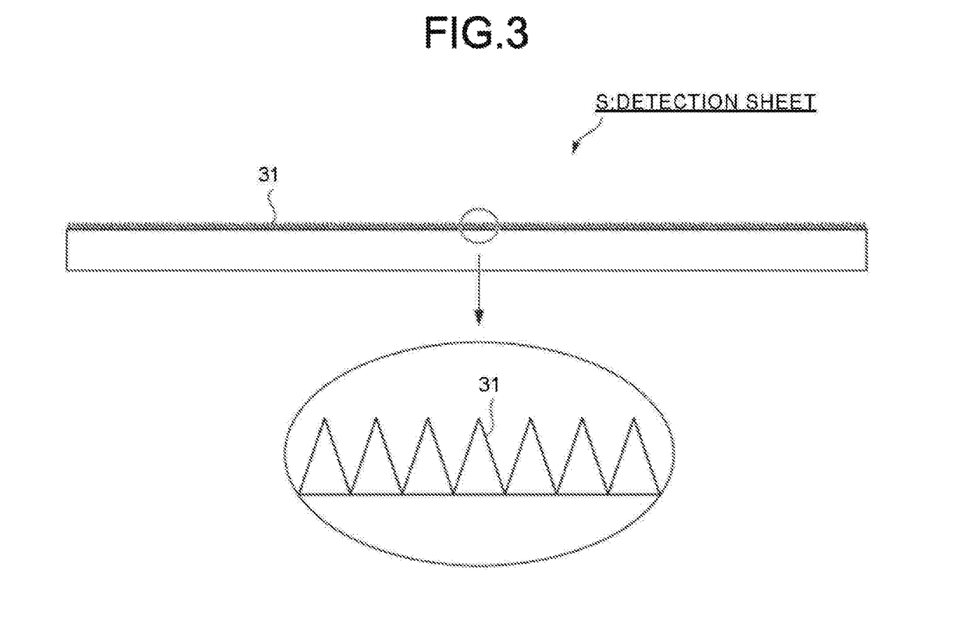
FIG. 3 is a schematic diagram exemplifying the structure of a detection sheet S.

FIG. 3 is a schematic diagram exemplifying the structure of the detection sheet S. The detection sheet S is a semi-transparent sheet having a diffuse reflection surface 31 on which tiny recesses and protrusions are arranged. Further, the structure of the detection sheet S in FIG. 3 is an example, and the detection sheet S may be any structure as long as the penetrating light can be diffused by the detection sheet S at a certain level. At which level the light is diffused is determined by taking the following two points into consideration. The first point is that the read image is too blurred if the light is diffused excessively; and the second point is that the brightness of the mirror reflection area included in the read image is lowered if the light is not diffused adequately. Alternatively, a plurality of detection sheets S different in the level of the diffusion capacity thereof may be prepared for the user to select.

Figure 4:
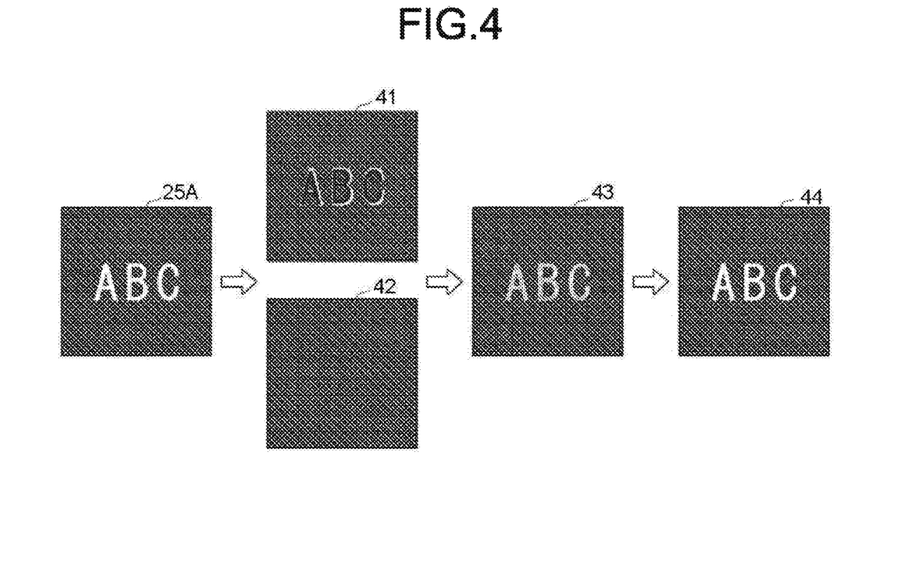
FIG. 4 is a diagram exemplifying a processing on a special document mode which is carried out in an image processing apparatus 100 according to the embodiment.

FIG. 4 is a diagram exemplifying a processing in a special document mode carried out in the image processing apparatus 100 according to an embodiment. The sheet 25A shown in FIG. 4 is a concrete example of the sheet 25 having a mirror reflection area. On the black ground of the sheet 25A, there are golden characters 'ABC' which constitute a mirror reflection area.

The image processing apparatus 100 scans the sheet 25A without arranging the detection sheet S. Then, the system control section 30 of the image processing apparatus 100 obtains image data 41 or image data 42. The image data 41 indicates the image data obtained by scanning the sheet 25A on which the golden characters 'ABC' with a convex-concave outer edge are printed. The image data 42 indicates the image data obtained by scanning the sheet 25A on which the golden characters 'ABC' without a convex-concave outer edge are printed. As shown in the image data 41 and 42, the mirror reflection area is black. As shown in the image data 41, if there are recesses and protrusions on the outer edge of the mirror reflection area, then the brightness of a part of the recesses and protrusions is above a predetermined level.

Next, the image processing apparatus 100 scans the sheet 25A while setting the detection sheet S. In this way, the system control section 30 obtains image data 43. As shown in the image data 43, scattered light is detected in the detection sheet S, and the characters 'ABC' constituting a mirror reflection area have a predetermined level of brightness.

The system control section 30 removes the image data 41 or 42 from the image data 43 to determine the mirror reflection area. The system control section 30 outputs image data 44 obtained by replacing the color of the determined mirror reflection area with a user-designated color to the printer section 130. In this way, the printer section 130 of the image processing apparatus 100 outputs a sheet on which the image data 44 is printed.

Next, the structure of the system control section 30 and the processing carried out by the system control section 30 are described below in detail.

Figure 5:
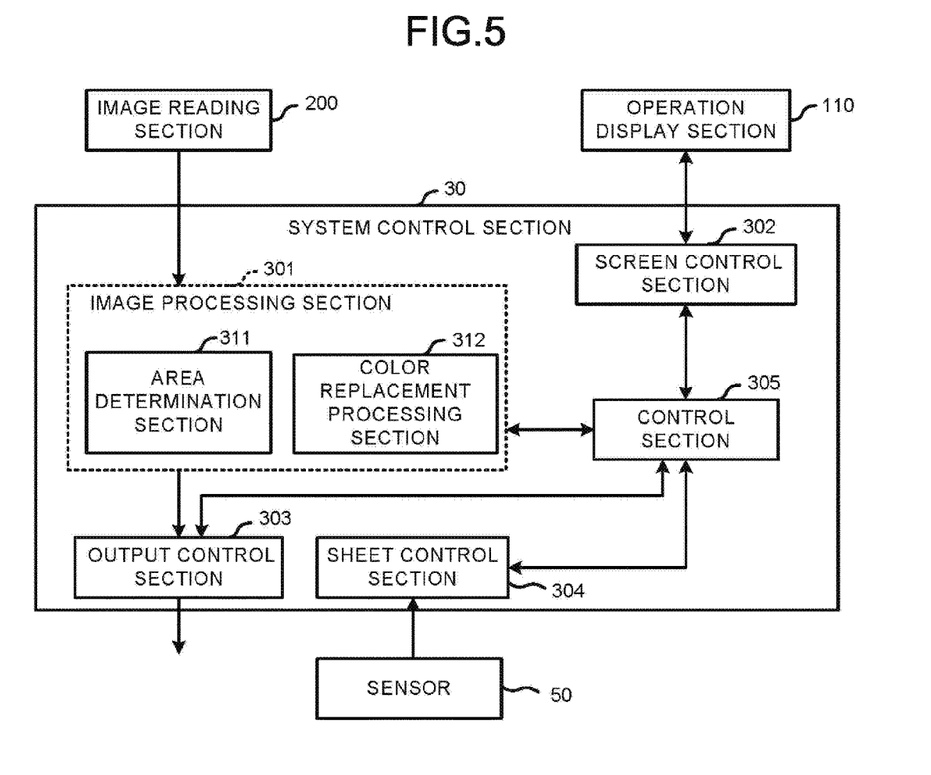
FIG. 5 is a schematic diagram exemplifying the structure of a system control section 30.

FIG. 5 is a schematic diagram exemplifying the structure of the system control section 30. The system control section comprises an image processing section 301, a screen control section 302, an output control section 303, a sheet control section 304 and a control section 305. The image processing section 301 includes an area determination section 311 and a color replacement processing section 312.

The image processing section 301 carries out an image processing for the printing of the image data received from the image reading section 200. The area determination section 311 and the color replacement processing section 312 included in the image processing section 301 operate in a special document mode. The special document mode includes an one-time reading mode in which the sheet 25 is read only once and a two-times reading mode in which the sheet 25 is read twice.

The one-time reading mode is a mode in which the sheet 25 is scanned while the detection sheet S is arranged to obtain first image data. The two-times reading mode is a mode in which in addition to the first image data, second image data is obtained by scanning the sheet 25 without arranging the detection sheet S.

In the one-time reading mode, the area determination section 311 determines an area designated (or selected) by the user in the first image as a mirror reflection area. In the two-times reading mode, the area determination section 311 determines a mirror reflection area by comparing the first image data with the second image data. The area determination section 311 determines, for example, the area where the value of the difference of the first image data and the second image data exceeds a predetermined threshold as a mirror reflection area.

The color replacement processing section 312 acquires, from the control section 305, color information relating to a color used to replace the color of the mirror reflection area designated by the user. The color replacement processing section 312 replaces the color of the mirror reflection area determined by the area determination section 311 with the color indicated by the acquired color information with respect to the first image data and outputs the color-replaced image data.

The screen control section 302 generates screen information to be displayed on the operation display section 110 and receives an input signal from the operation display section 110. The output control section 303 instructs the printer section 130 to print the image data according to the image data output from the image processing section 301. The sheet control section 304 receives a detection signal from the sensor 50 which is used to detect whether or not the detection sheet S is placed on the original document table glass 201. The sensor 50 is arranged nearby the original document table glass 201 to detect whether or not the detection sheet S is placed on the original document table glass 201. The sheet control section 304 outputs detection result information indicating the detection result of the sensor 50 to the control section 305 in response to a request from the control section 305.

The control section 305 controls the working mode of the image processing apparatus 100 and each section in the system control section 30. The control section 305 displays the image data processed by the image processing section 301 on the operation display section 110 for preview. The control section 305 receives, from the operation display section 110, an instruction signal on a setting change through the screen control section 302. The control section 305 controls the jobs or the contents of the processing executed by the image processing section 301, the screen control section 302, the output control section 303 and the sheet control section 304 according to the setting change contained in the received instruction.

Figure 6:
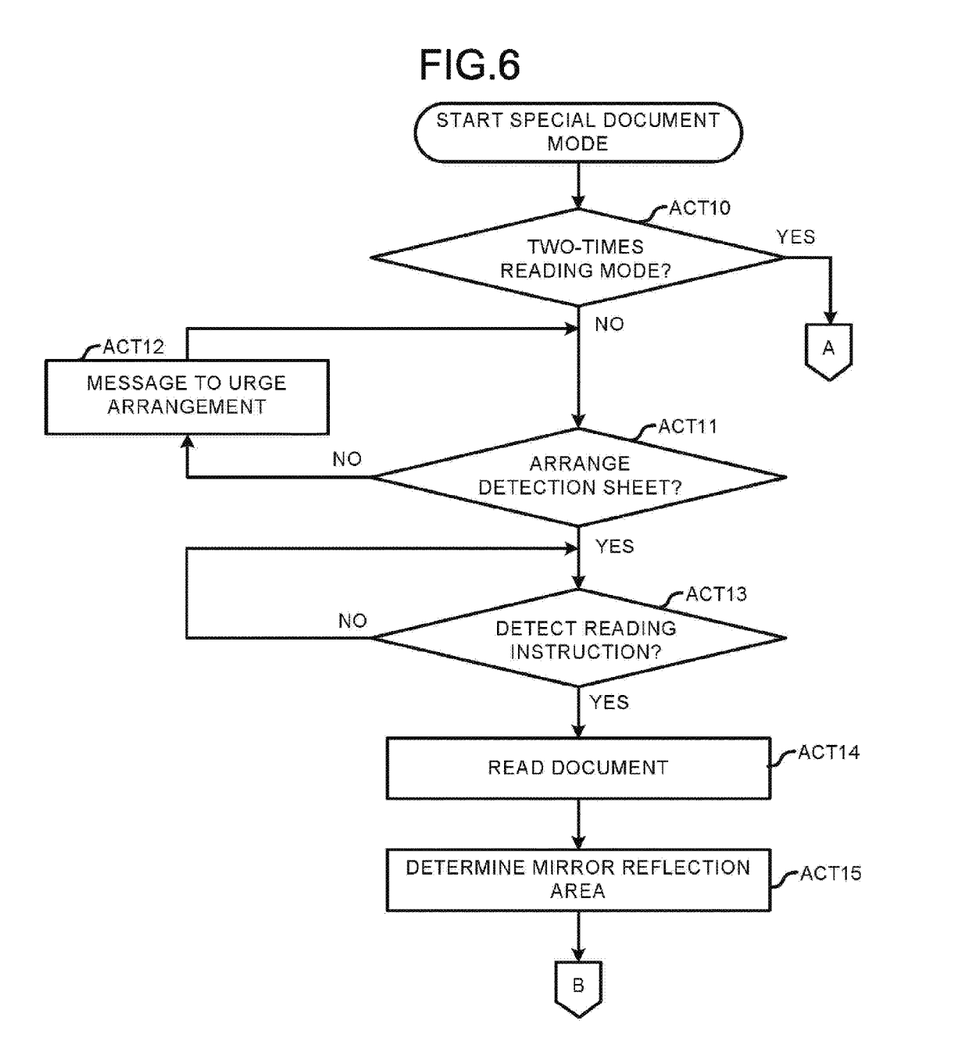
FIG. 6 is a flowchart exemplifying operations in the special document mode which are carried out in the system control section 30.
Figure 7:
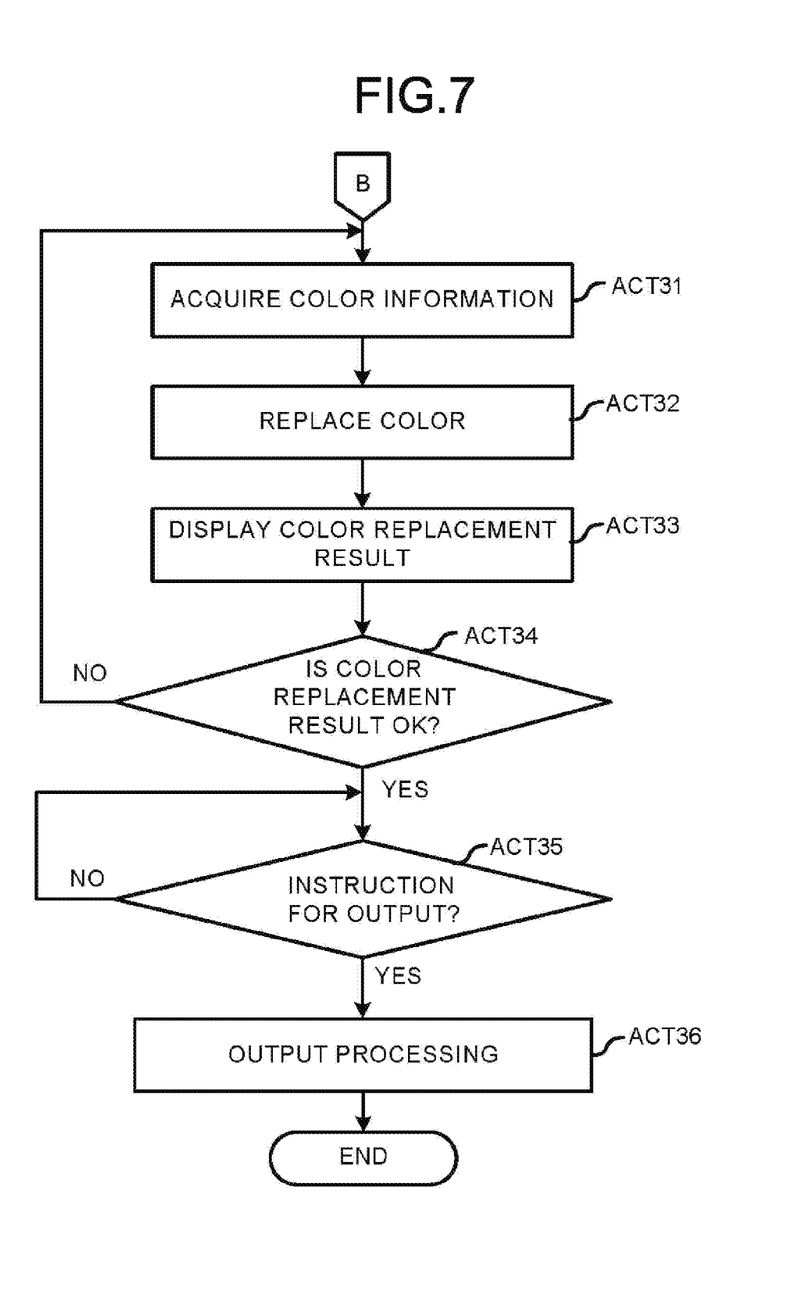
FIG. 7 is a flowchart exemplifying operations in the special document mode which are carried out in the system control section 30.
Figure 8:
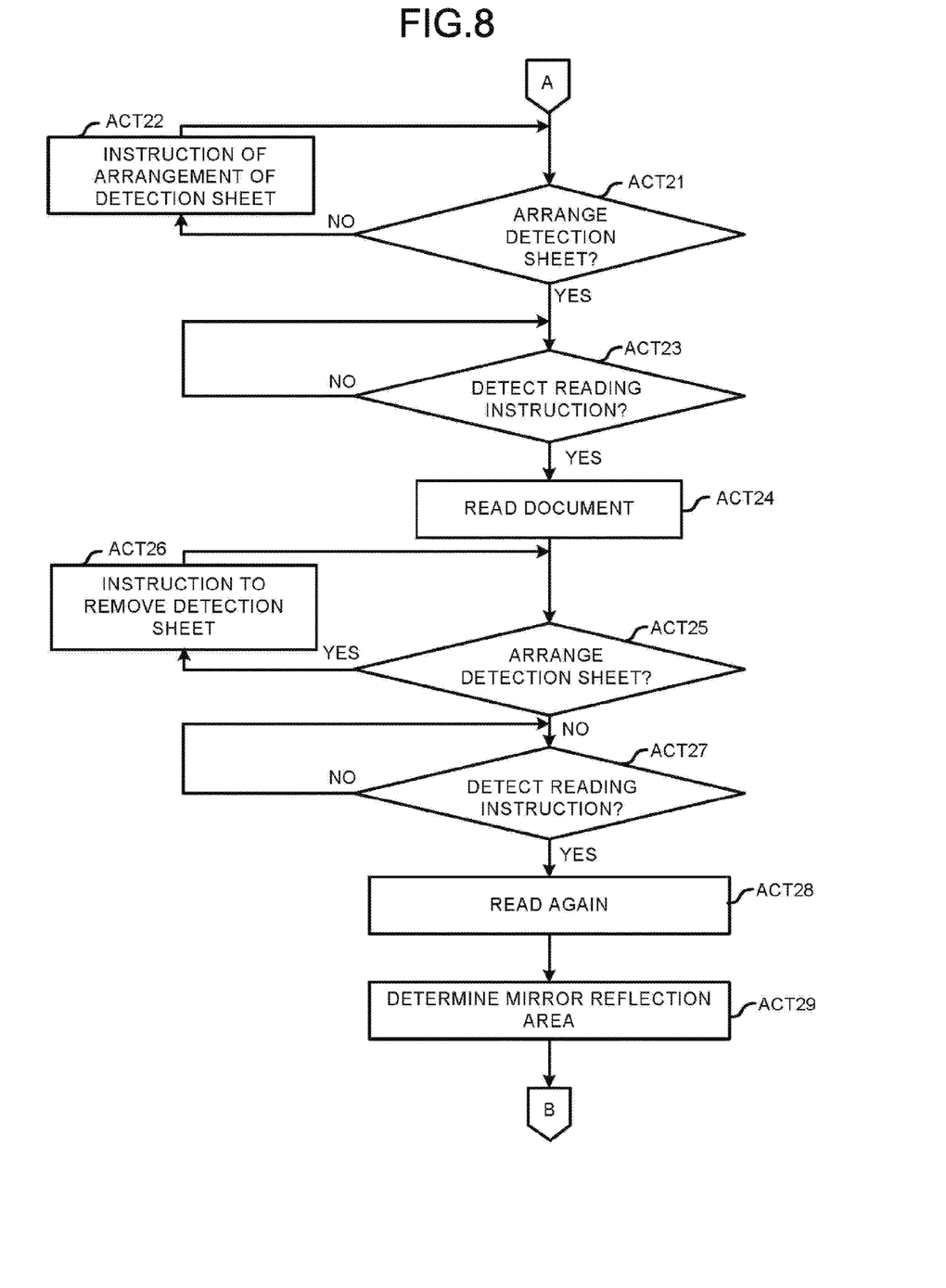
FIG. 8 is a flowchart exemplifying the operations in the special document mode which are carried out in the system control section 30.

FIG. 6-FIG. 8 are flowcharts exemplifying the operations carried out in a special document mode in the system control section 30.

First, the control section 305 determines whether the two-times reading mode is designated by the user or not (=one-time reading mode) (Act 10). Herein, if the control section 305 determines that the one-time reading mode is designated by a user (Act 10: No), then the control section 305 acquires the detection result of the sensor 50 from the sheet control section 304. The control section 305 determines, according to the acquired detection result, whether or not the detection sheet S is placed on the original document table glass 201 (Act 11).

If the detection sheet S is not placed on the original document table glass 201 (Act 11: No), the control section 305 displays, on the operation display section 110, a message for urging the user to place the detection sheet S (Act 12). The control section 305 returns to the processing in Act 11 after completing the processing in Act 12. Further, the control section 305 exchanges signals and data with the operation display section 110 via the screen control section 302.

If the control section 305 determines that the detection sheet S is placed on the original document table glass 201 (Act 11: Yes), the control section 305 determines whether or not a reading instruction for the reading of the sheet 25, that is, an original document, is given by the user (Act 13). If the control section 305 determines that there is no reading instruction for the reading of the sheet 25 (Act 13: No), the control section 305 carries out the processing in Act 13 regularly until there is a reading instruction. If the control section 305 determines that there is a reading instruction for the reading of the sheet 25 (Act 13: Yes), the control section 305 instructs the image reading section 200 to read the sheet 25 (Act 14). The image reading section 200 reads the sheet 25 to output first image data. In this way, the image processing section 301 acquires the first image data. The area determination section 311 determines an area designated (or selected) by the user in the first image data as a mirror reflection area (Act 15). As the first image data is image data obtained by using the detection sheet S, the mirror reflection area has a certain level of brightness, which makes it easy for the user to designate a mirror reflection area.

The control section 305 proceeds to the processing in Act 31 shown in FIG. 7 after completing the processing in Act 15. The control section 305 displays, on the operation display section 110, a screen for the user to designate a replacement color. In this way, the user designates, on the operation display section 110, a color for replacing the color of the mirror reflection area. Generally, the user designates a color 'yellow' for replacement if the color of the mirror reflection area is golden or a color 'gray' for replacement if the color of the mirror reflection area is silver. However, if a special golden or silver toner or ink is provided in the printer section 130, then the item 'replacement color' may be 'golden' or 'silver'. The control section 305 acquires color information relating to the user-designated color through the operation display section 110 (Act 31). The control section 305 outputs the acquired color information to the color replacement processing section 312.

The color replacement processing section 312 replaces the color of the mirror reflection area determined by the area determination section 311 according to the color information acquired from the control section 305 in the first image data (Act 32). The color replacement processing section 312 outputs color-replaced image data obtained by replacing the color of the mirror reflection area with a color determined according to the color information to the control section 305 and the output control section 303.

The control section 305 displays, on the operation display section 110, the color-replaced image data along with an 'OK' button and an 'NG' button (Act 33). The user confirms the color-replaced image data displayed on the operation display section 110 and presses the 'OK' button if satisfied with the displayed image or the 'NG' button if not satisfied with the displayed image. The control section 305 receives, through the operation display section 110, information on whether or not the color replacement result in response to the operation of the user on the 'OK' button or 'NG' button is OK (Act 34). If the color replacement result is not OK (Act 34: No), the flow returns to the processing in Act 31 so that the control section 305 can display, on the operation display section 110, a screen for the user to designate another replacement color again.

If the color replacement result is OK (Act 34: Yes), the control section 305 determines whether or not there is an instruction on the output of the color-replaced image data (Act 35). Specifically, the control section 305 displays, on the operation display section 110, a screen for the user to select the output format of the color-replaced image data and give an output instruction. For example, the user selects an output format which contains the setting of a printed medium and the setting of a magnification of printing and presses an output instruction button. The control section 305 receives, through the operation display section 110, information relating to an output instruction corresponding to the operation of the user on the output instruction button. The control section 305 determines whether or not there is an instruction on the output of the color-replaced image data according to information relating to the received output instruction. If the control section 305 determines that there is no instruction on the output of the color-replaced image data (Act 35: No), the control section 305 carries out the processing in Act 35 regularly until there is an instruction on the output of the color-replaced image data.

If the control section 305 determines that there is an instruction on the output of the color-replaced image data (Act 35: Yes), the control section 305 instructs the output control section 303 to output the color-replaced image data. The output control section 303 instructs, for example, the printer section 130 to print the color-replaced image data according to the color-replaced image data output from the image processing section 301 (Act 36). In this way, the printer section 130 forms, on a sheet, an image based on the color-replaced image data.

The processing carried out when the result of Act 10 shown in FIG. 6 is 'Yes' is described below with reference to FIG. 8. If it is determined in the processing in Act 10 that the two-times reading mode is designated by the user (Act 10: Yes), the control section 305 proceeds to carry out the processing in Act 21-Act 24. The processing in Act 21-Act 24 which is identical to that in Act 11-Act 14 shown in FIG. 6 is not described here repeatedly.

The image processing section 301 acquires the first image data through the processing in Act 24. Then, the control section 305 acquires the detection result of the sensor 50 from the sheet control section 304. The control section 305 determines, according to the acquired detection result, whether or not the detection sheet S is placed on the original document table glass 201 (Act 25). If the control section 305 determines that the detection sheet S is placed on the original document table glass 201 (Act 25: Yes), the control section 305 displays, on the operation display section 110, a message for urging the user to remove the detection sheet S (Act 26). The control section 305 returns to the processing in Act 25 after completing the processing in Act 26.

If the control section 305 determines that no detection sheet S is placed on the original document table glass 201 (Act 25: No), the control section 305 determines whether or not an instruction on the reading of a sheet 25, that is, an original document, is given by the user (Act 27). If the control section 305 determines that there is no reading instruction on the reading of the sheet 25 (Act 27: No), the control section 305 carries out the processing in Act 27 regularly until there is a reading instruction. If the control section 305 determines that there is a reading instruction on the reading of the sheet 25 (Act 27: Yes), the control section 305 instructs the image reading section 200 to read the sheet 25 (Act 28). The image reading section 200 reads the sheet 25 again to output second image data. In this way, the image processing section 301 acquires the second image data. The area determination section 311 determines a mirror reflection area by comparing the first image data with the second image data (Act 29). The flow proceeds to the processing in Act 31 shown in FIG. 7 after the processing in Act 29 is carried out.

Further, in FIG. 8, the processing carried out in Act 21-Act 24 to acquire the first image data and the processing carried out in Act 25-Act 28 to acquire the second image data may be carried out in the reverse sequence, that is, the second image data may be acquired prior to the first image data.

According to at least one of the foregoing embodiments, with the use of the detection sheet S, the sheet 25 having a mirror reflection area can be read more properly, which means that the mirror reflection area can be distinguished in the read image data when compared with the conventional technology. Further, the color of the mirror reflection area can be replaced with a user-designated color.

Further, the foregoing detection sheet S may be manually fed by the user or fed automatically. The foregoing detection sheet S, which is described herein as a structure capable of physically diffusing light, is not limited to this. For example, the detection sheet S may be a sheet having an electrode in which liquid crystal is encapsulated which has a structure of controlling the diffusion of the light penetrating the sheet by switching on or off the electrode electrically. In this way, the trouble caused by setting and removing the detection sheet S is reduced or eliminated by controlling the diffusion of light by switching on or off the electrode electrically.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
   a scanner section configured to emit light from a light source to an original document placed on an original document table to generate a first image area based on the original document, the original document including a mirror reflection image area which reflects light like a mirror;
   the scanner section configured to emit light from the light source to a light diffusing sheet and an original document placed on the original document table to generate a second image area based on the original document, the light diffusing sheet being placed between the original document table and the original document, the surface of the light diffusing sheet being formed uneven; and
   an area determination section configured to determine image data corresponding to the mirror reflection image area in a first image by comparing the first image area with the second image area; and
   a color replacement processing section configured to change a color of the image data corresponding to the mirror reflection image area determined by the area determination section with a predetermined color; and
   a printer section configured to form an image on a predetermined sheet based on the image data whose color is changed by the color replacement processing section.

2. The image forming apparatus according to claim 1, further comprising
   an area designation section for the user to designate a mirror reflection area with respect to the first image area, wherein
   the area determination section determines the mirror reflection area according to the area designated by the user with the area designation section.

3. The image forming apparatus according to claim 1, further comprising
   a color designation section for the user to designate a color optionally; and
   a color replacement processing section configured to replace the color of the area determined by the area determination section with the color designated by the color designation section.

4. An image forming method, comprising:
   emitting light from a light source to an original document placed on an original document table to generate a first image data based on the original document, the original document including a mirror reflection image area which reflects light like a mirror;
   emitting light from the light source to a light diffusing sheet and an original document placed on the original document table to generate a second image data based on the original document, the light diffusing sheet being placed between the original document table and the original document, the surface of the light diffusing sheet being formed uneven; and
   determining image data corresponding to the mirror reflection image area in a first image by comparing the first image data with the second image data;
   changing a color of the image data corresponding to the mirror reflection image area determined by the determining with a predetermined color; and forming an image on a predetermined sheet based on the image data whose color is changed.

5. The image forming method according to claim 4, wherein the surface of the light diffusing sheet has a plurality of recesses and protrusions.

\* \* \* \* \*